April 30, 1946.    E. J. BLISS    2,399,424
MEANS AND METHOD OF FITTING SHOES
Filed Feb. 10, 1942    2 Sheets-Sheet 1
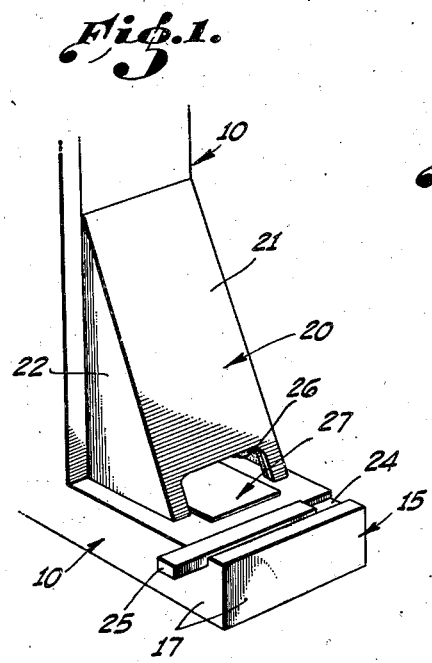
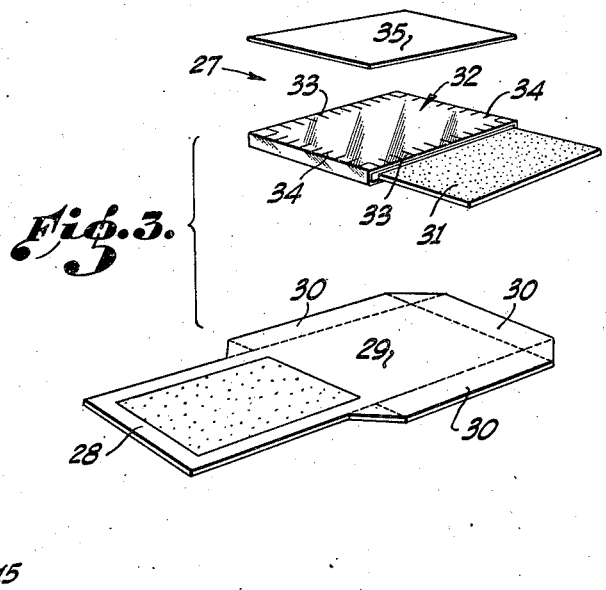
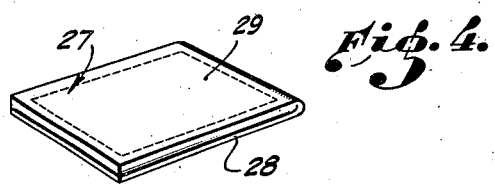
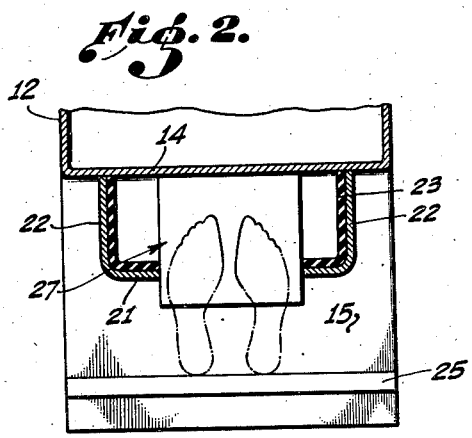
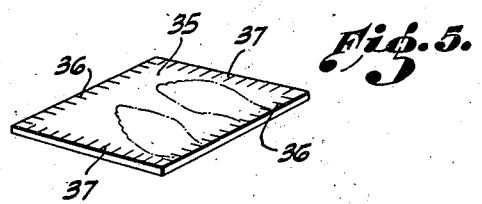
INVENTOR
Elmer Jared Bliss
BY Joseph F. Westall
ATTORNEY April 30, 1946.  E. J. BLISS  2,399,424
MEANS AND METHOD OF FITTING SHOES
Filed Feb. 10, 1942   2 Sheets-Sheet 2
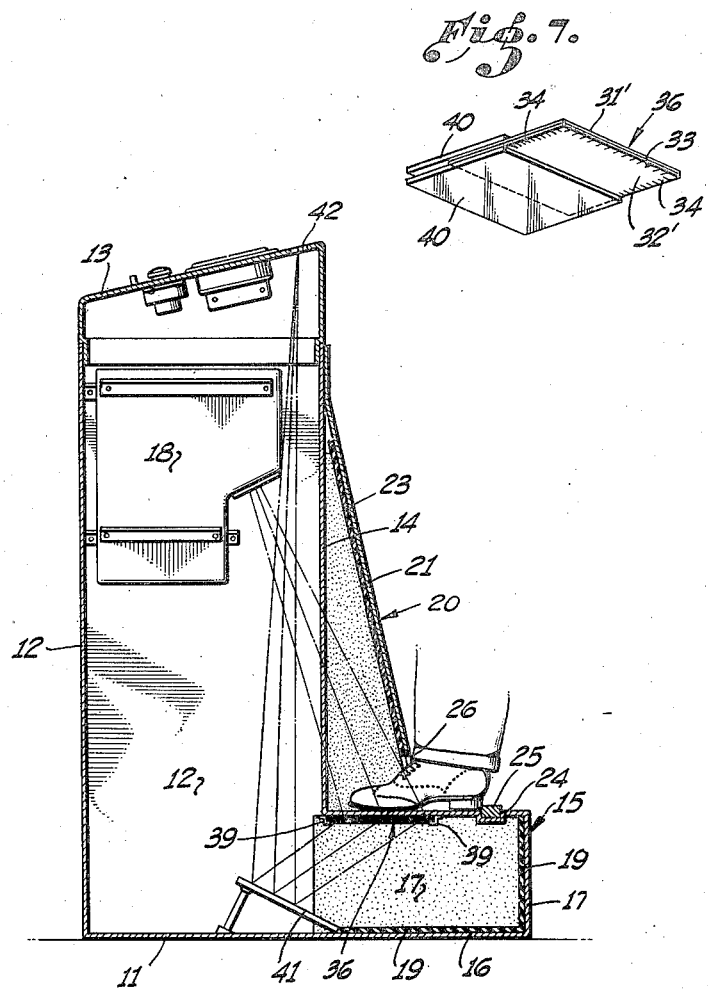
INVENTOR
Elmer Jared Bliss
BY Joseph F. Westall
ATTORNEY Patented Apr. 30, 1946

2,399,424

UNITED STATES PATENT OFFICE 2,399,424

MEANS AND METHOD OF FITTING SHOES

Elmer Jared Bliss, Chilmark, Mass.

Application February 10, 1942, Serial No. 430,217

2 Claims. (Cl. 250—50)

This invention relates to means and methods of fitting shoes, contemplating essentially X-ray apparatus for selectively taking a radiograph or a fluoroscopy of the feet of a person to be fitted with shoes on a medium recording length-size and width-size scales from which the size of shoes required for proper fitting of the customer's feet may be calculated with accuracy, thus dispensing to a great extent with the numerous fittings ordinarily required of a customer.

In the art prior to my invention several types of X-ray cabinets particularly adapted for fluoroscoping or for taking radiographs of the feet while substaining the normal load of the customer have been developed. One of such apparatuses is disclosed in my co-pending application S. N. 343,202, filed June 29, 1940, upon which Letters Patent No. 2,315,149 were granted March 30, 1943, for X-ray machines. These prior devices are designed and intended for use in examining a prospective customer's feet while wearing shoes theretofore selected with the aid of measurements taken of the feet in the usual manner, i. e., by the use of a size stick or other well known measuring device, in order to generally indicate the propriety of the fit of the pre-selected shoes.

It is the general object of the present invention to provide a method for determining the leigth and width in terms of shoe sizes of the feet of the customer as well as of his shoes, if desired, either by radiographing or fluoroscoping the feet on media recording shoe-size indicia.

Another object is to provide a screen adapted to fluoresce in response to X-ray excitation mounted below the platform on which the customer is supported, and a mirror to reflect light rays radiating from the screen to a suitable viewing aperture, in combination with a scaled mask interposed between the screen and mirror to produce a visual representation of the outline of the feet, the bone structure thereof and, if the feet are shod, an outline of the shoes, all framed by scales from which the shoe size required for a proper fitting of the customer's feet may be determined.

Another object is to provide apparatus for making a radiograph of the feet of a customer to be fitted with shoes, in combination with means for indicating the position of the feet in the X-ray beam relative to the film so as to record on the latter a representation of the bone structure as well as the outline of the feet in the radiograph at a pre-determined location with respect to scale indicia carried by or recorded on the film.

Another object is to provide a cabinet for the X-ray apparatus, forming a hood for the X-ray beam entirely lead-lined, and having an opening therein for the insertion of the portions of the feet to be fluoroscoped or of which the radiograph is to be made, thus insulating against stray radiation or deflection of X-rays outside of the area of the platform on which the feet are to be placed.

Another object is the provision of a platform to support the person whose feet are to be radiographed in combination with means for retaining thereon a guide adapted for removable reception by the platform to indicate the proper disposition of the feet of the customer on the platform preparatory to taking a radiograph or making a fluoroscopy.

Another object is to provide a cassette for film comprising a folder having a lead backing for the film to stop X-rays passing through the cover of the folder and the film, in combination with an envelope for a paper coated with a substance which will fluoresce under X-ray excitation, said envelope carrying indicia adapted to be recorded on the film upon exposure of the coated paper to the X-ray beam.

Other objects, features and advantages of my invention such for example as simplicity of construction, ease of manipulation and use, as well as adaptability for attaining positive and accurate measurement of the feet and/or shoes, will be apparent to those of skill in the art to which my invention appertains upon an examination of the following description read in the light of the accompanying drawings, in which—

Fig. 1 is a perspective view of cabinet, partially broken away, illustrating particularly the platform on which the customer stands during use of the apparatus, and showing a cassette in position as when taking a radiograph;

Fig. 2 is a sectional view, partially broken away, of the hood for the X-ray beam, looking downwardly toward the platform with the position of the feet thereon depicted in dotted lines;

Fig. 3 is a composite perspective view of the cassette in open position with the elements adapted to be enclosed therein in vertical relation therewith as when assembled;

Fig. 4 is a perspective view of the cassette as it appears when folded and ready for use;

Fig. 5 is a perspective view of a radiograph showing the scales recorded on the edges thereof with the outline of the forepart of the feet delineated between the scales;

Fig. 6 is a sectional view of the complete cabinet showing the preferred position of the feet, the mirror, and viewing aperture as when utilized in making a fluoroscopy of the feet, and illustrating its use;

Fig. 7 is a sectional view of the platform for the feet of the customer showing the screen assembly employed in fluoroscopy.

Referring to the drawings, in which like numerals indicate similar parts throughout the several views, 10 designates generally the cabinet comprising a floor 11, sides 12, top 13 and rear wall 14, the latter terminating above the floor. From the lower edge of the rear wall 14 a platform 15 extends being supported above an extension 16 of floor 11 of the cabinet by walls 17. The area of the cabinet below platform 15 is thus in open communication with the cabinet 10.

X-ray apparatus (not shown) of a conventional type, and enclosed in a suitable case, 18, is hung in the upper part of cabinet 10 and arranged to direct an X-ray beam obliquely downward through the rear wall 14 to platform 15. The walls 17 and extension 16 of floor 11 of the cabinet are lined by lead plates indicated by the numeral 19 to stop X-rays passing through the platform upon energization of the X-ray apparatus. As a further precaution against stray radiation of X-rays, a hood 20 is provided which overhangs the forward portion of platform 15. Hood 20 comprises an oblique wall 21 mounted at its lower end to the platform and sloping upwardly to rear wall 14 of the cabinet slightly above the portion of case 18 from which the X-rays emanate. The sides of the hood 20 are closed by walls 22. The hood is lined with lead plates 23 to furnish an effective insulation, preventing the passage of both primary or secondary X-rays directed or deflected thereagainst.

Platform 15 is formed adjacent its rearward edge with a transverse channel 24 for the slidable reception of a guide member 25 for indicating the position of the feet of a customer when taking a radiograph or making a fluoroscopy, as is hereinafter more in detail described. The lower middle portion of wall 21 of hood 20 is cut away to form an opening 26 through which feet of the customer may be extended.

When a radiograph is to be taken the cassette 27 illustrated in Figs. 3 and 4 is employed. Cassette 27 consists of a folder comprising a bottom member 28 embodying a suitable lead backing and a cover 29 adapted to be folded over upon bottom 28 and secured thereto by suitable means. The cover 29 is formed with edges 30 which are adapted to be folded inwardly for a purpose about to be described. A sheet of paper 31 coated with barium sulphate or other substance adapted to fluoresce in response to X-ray excitation, is enclosed in an envelope 32 composed of Cellophane or like transparent material. Two opposite edges of one surface of the envelope have delineated thereon scales 33 of shoe width-sizes; each of the other opposed edges carry a length-size scale 34, which may be printed or otherwise marked by opaque means.

In assembling cassette 27, a sheet of film 35 is placed on cover 29. The transparent envelope 32 with the coated paper 31 therein is placed on top of the film 35 with the scaled surface of the envelope interposed between the coated paper 31 and the film 35. The edges 30 of the cover 29 are folded inwardly to retain the film 35 and envelope 32 in fixed position relative to the cassette 27 after which the cassette is folded and bottom 28 and cover 29 are secured together as above indicated.

When it is desired to take a radiograph of the feet of a prospective customer the cassette 27, assembled as above described is inserted through opening 26 in hood 20 and laid with the bottom 28 of the cassette in contact with the platform 15 and with one of the edges thereof which is parallel to the width scales 33 of the enclosed envelope 32, abutting against rear wall 14 of the cabinet. The customer then stands upon the cassette with the back of his heels against guide 25. It will thus be seen that the length-size scales 34 on the envelope within the cassette will be arranged on lines parallel to the customer's feet. It will be understood that the calibrations of the respective length-size scales 34 will be identified by numerals (not shown) coordinated with length-sizes of shoes adapted for the proper fit of feet of length equal to the distances between the heel guide 25 and the lines coinciding with said calibrations, respectively. To this end heel guide 25 and retaining channel 24 therefor are spaced from rear wall 14 of the cabinet 10, relative to which the arrangement of the length-size calibrations is calculated (the cassette being in abutting relation with the wall when in use), a predetermined distance to define the position of the feet whereby a transverse line tangent to the tips of the toes of feet of any size placed on the platform will coincide, respectively, with calibrations of the length-size scale 34 carried by envelope 32 thereunder, which are identified by numbers indicating the size of shoes required for a proper fit of the particular feet measured.

Upon energization of the X-ray apparatus an X-ray beam will be directed downwardly through the rear wall 14 of the cabinet and against the feet and cassette 27 so as to cause fluorescence of different portions of the coated paper 31 within the cassette to degrees varying in proportion to the strength of the beam permitted to reach it, thus causing shadows to appear on the coated paper of the outline of the feet as well as of the bone structure thereof. The light radiated by the fluorescent paper 31 passes upwardly through the top sheet of the transparent envelope 32 to expose the sensitized film but with the scales 33 and 34 masking off part of the rays so as to record the scales on the edges of the film as at 36 and 37, respectively (Fig. 5). The developed picture accordingly depicts the outline of the balls of the feet as disposed between certain of the width calibrations of the scales 36. The number of such calibrations between parallel lines tangent to the sides of the foot delineation at its widest point indicates the width-size of shoe adapted to fit feet thus radiographed. Similarly the length-size calibrations of scales 37 nearest adjacent to which a line tangent with the forepart of the toe delineations, passes, will indicate the length-size of shoes required for a proper fitting of the customer's feet. It will be understood that while I have described the radiographing of unshod feet, the feet may be radiographed while wearing shoes. The developed picture in such case will depict the effect on the bone structure of the feet due to its confinement by the shoes, as well as to indicate the shoe-size required for the feet, the outline of which may be visible in the radiograph even though the feet are shod, so as to enable comparison thereof with the size marking in the shoes.

It will be understood that, if desired, envelope 32 may carry other scales (not shown) for recording on the film the overall length and widths of shoes radiographed either in terms of inches or of shoe-sizes to afford a means of verifying the size marked in the shoe.

For purposes of making a fluoroscopy of the feet, I provide a screen 36 comprising a sheet of paper 31' coated with the substance adapted to fluoresce in response to X-ray excitation, e. g., barium sulphate, enclosed in a transparent envelope 32' secured by suitable brackets 39 between sheets of glass 40 to the underside of the portion of platform 15 located below hood 20. The envelope 32' may be identical to that utilized in the cassette 27, as above described. However, the scales 33 and 34 delineated on the edges of envelope 32' are preferably carried on the underside of the envelope so as to be disposed below screen 36, for a purpose later referred to.

A mirror 41 is arranged on the floor of the cabinet in tilted relationship therewith to receive and reflect light rays radiating from the screen 36, when the latter is fluoresced, upwardly between the case 18 for the X-ray apparatus and rear wall 14 of the cabinet to a viewing aperture 42 in the top 13 of cabinet 10.

In accordance with the use of the apparatus for making a fluoroscopy of the feet of a customer, the latter stands directly on the platform with the forepart of his feet extending through opening 26 in hood 20 and in a position over the screen 36, the heels of the feet being in abutting relation with guide 25, as heretofore explained with reference to the use of apparatus when taking a radiograph. The X-ray apparatus is then energized to cast an X-ray beam onto the feet and screen through platform 15 so as to cause fluorescence of screen 36, with the outline of the feet and the bone structure thereof as well as the outline of the shoes, if worn, recorded on the screen. The representations thus recorded may be seen through the viewing aperture 42 with the aid of the mirror 41, but due to the interposition of the scaled undersheet of the envelope 32', the calibrations of the scales 33 and 34 will be visible as if recorded on the screen, appearing at the edges thereof. It will thus be observed that by reading the scale 33 and 34 with respect to the position of the feet delineations on screen 36, the width and length of the feet in terms of shoe sizes may be immediately determined. After the fitting of the customer's feet by the shoes of the size selected with the aid of the readings of the scales as just described, the feet may again be fluoroscoped while wearing the shoes to indicate to the satisfaction of the customer, the accuracy of the fit of the shoes selected, the fluoroscope clearly showing the effect on the feet bone structures as well as on the surrounding tissue of their confinement by the shoes.

In the foregoing description and accompanying drawings I have described and illustrated but one of the many embodiments in which my invention may be incorporated. It will be understood that numerous changes in size, design, proportion and number of the various parts may be made, that the scale mask provided by the envelopes 32 and 32' may comprise a single sheet, or a mask in the form of a frame may be substituted for the transparent envelopes if desired, or the scale may be printed on the screen or the fluorescent material otherwise obliterated on lines delineating the scales, and further, that photosensitive paper may be substituted for the cellulose film referred to hereinabove—all without departing from the spirit of my invention as defined by the appended claims.

What I claim and desire to secure by Letters Patent is:

1. In a device of the character described, a cabinet having a rectangular lateral extension at its lower end, sides and floor of said extension being lined with X-ray insulation, the top of said extension forming a platform, a hood extending obliquely from a wall of said cabinet and over a portion of said platform, X-ray insulation within said hood, a case within said cabinet, X-ray apparatus within said case positioned to direct X-ray beams obliquely downward through said cabinet into said hood and through said platform below said hood, said hood having an opening in its lower end over said platform for insertion of the forepart of a foot, a fluorescent screen carried by said platform beneath the hood, a mirror obliquely positioned in the bottom of said cabinet, and a viewing aperture in the top of said cabinet.

2. In a device of the character described, a cabinet having a rectangular lateral extension at its lower end, sides and floor of said extension being lined with X-ray insulation, the top of said extension forming a platform, a hood extending obliquely forming a wall of said cabinet over a portion of said platform, X-ray insulation within said hood, a case within said cabinet, X-ray apparatus within said case positioned to direct X-ray beams obliquely downward through said cabinet into said hood, said hood having an opening in its lower end over said platform for insertion of the forepart of a foot, a fluorescent screen carried by said platform beneath said hood, a viewing aperture at the top of said cabinet, and reflecting means for the image on said fluorescent sheet to said viewing aperture.

ELMER JARED BLISS.